Figure 1:
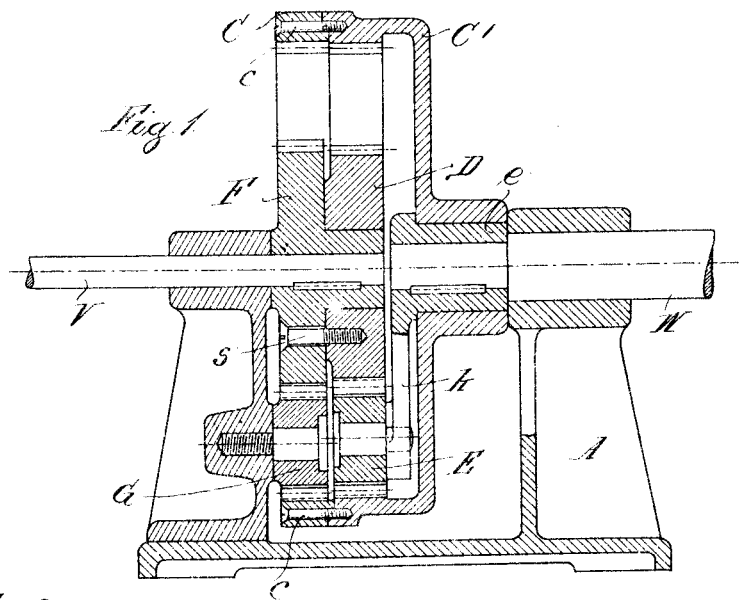

H. BARTSCH.
PLANETARY TRANSMISSION GEARING.
APPLICATION FILED JAN. 19, 1914.

1,124,834. Patented Jan. 12, 1915.

Witnesses:
S. C. McBride
L. H. Cadarr

Inventor:
Hans Bartsch
by
Foster Freeman Watson & Coe
Attorney

UNITED STATES PATENT OFFICE.

HANS BARTSCH, OF ZEHLENDORF, NEAR BERLIN, GERMANY.

PLANETARY TRANSMISSION-GEARING.

1,124,834.  Specification of Letters Patent.  Patented Jan. 12, 1915.

Application filed January 19, 1914. Serial No. 813,038.

*To all whom it may concern:*

Be it known that I, HANS BARTSCH, subject of the King of Prussia, residing at 31 Seehofstrasse, Zehlendorf, near Berlin, Germany, have invented certain new and useful Improvements in Planetary Transmission-Gearing, of which the following is a specification.

This invention relates to an improved planetary transmission gearing and has for its object to provide a compact transmission gearing while enabling a high velocity ratio to be obtained.

The present invention consists in the employment of the known arrangement in which two coupled trains of wheels, each comprising an inner, outer and intermediate wheel, are employed, one of the trains having a planet wheel.

According to the present invention instead of coupling only one wheel of the one train with one wheel of the other train as has heretofore been proposed, both the outer and inner wheels of the one train are respectively coupled to the outer and inner wheels of the other train so as to rotate in unison therewith, the two trains being of unequal velocity ratio so that, if the radius of the outer wheel of the one train is designated $r_1^a$ and that of the inner wheel of the same train $r_1^b$, while the outer and inner wheels of the other train are designated $r_2^a$ and $r_2^b$ respectively, the following variation will be obtained:

$$r_1^a : r_1^b \gtrless r_2^a : r_2^b.$$

The planet wheel of the one train is connected with one shaft by means of a crank arm, while the intermediate wheel of the other train is mounted in fixed journals and may therefore serve as the driving wheel.

If motion is imparted to the train whose intermediate wheel is journaled in fixed bearings the angular velocities of the outer wheels and inner wheels will be respectively equal since they are coupled together, but owing to the unequal ratio between the two trains the planet wheel will be subject to rolling conditions different from those of the fixed intermediate wheel of the other train and will consequently travel around transmitting its motion to the one shaft through the crank arm.

In the limiting case, that is to say, when the variation approximates to equality the velocity of travel of the axis of the planet wheel will approximate to zero, that is to say, a very high velocity ratio will be obtained so that it is advisable to select a variation which deviates as little as possible from the ratio $$r_1^a : r_1^b = r_2^a : r_2^b$$

In order that the invention may be more clearly understood reference is made to the accompanying drawings showing two embodiments of the invention by way of example.

Figure 2:
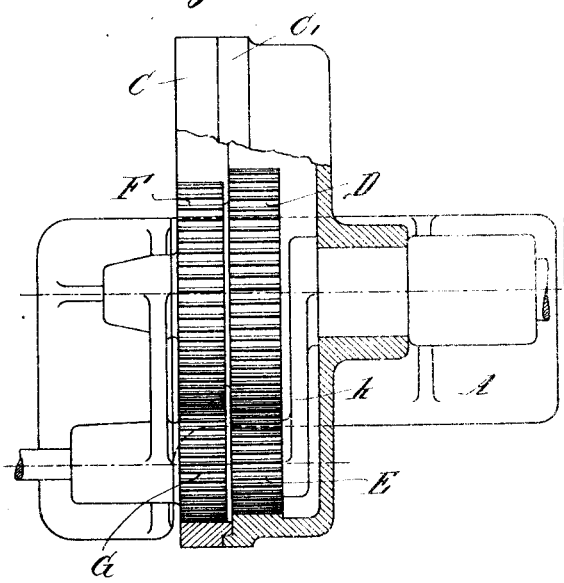
Figure 3:
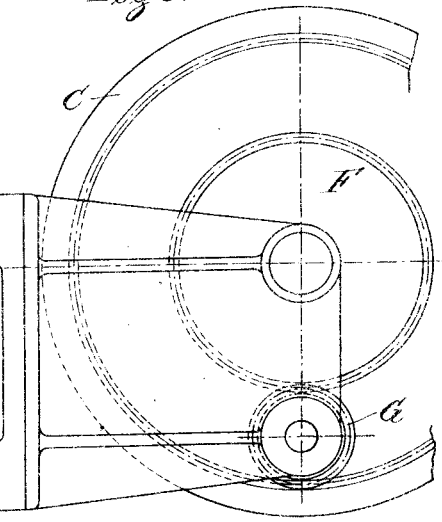

Figure 1 illustrates one form of my invention in section. Fig. 2 is a plan view partly in section of a slightly modified form of Fig. 1. Fig. 3 is a fragmentary side view of the gearing shown in Fig. 2.

As shown in Fig. 1 the two shafts V, W to be coupled are mounted at their ends in suitable bearings carried by a standard A. The shaft V carries a spur wheel F keyed on the shaft and which meshes with an intermediate wheel G stationarily journaled in the standard A and engaging in turn with the internally toothed wheel C. The wheels F, G, C constitute one train of the gearing which is coupled as hereinafter described with the other train, comprising the wheels D, E and C'. The spur wheel D is mounted upon the hub of the wheel F and coupled therewith by means of screw threaded bolts *s*. The wheels F and D consequently rotate at the same angular velocity. The outer wheels C and C' are similarly coupled together by screws *c* so that their angular velocity is also equal. The outer wheel C' is mounted so as to freely rotate upon a boss *e*, the boss *e* being keyed to the shaft W and having a crank arm *k* which carries the planet wheel E.

If the outer diameters of the wheels C, C' are respectively designated $r_1^a$ and $r_2^a$, and those of the inner wheels F and D respectively designated $r_1^b$ and $r_2^b$, it will be seen that, when $$r_1^a : r_1^b = r_2^a : r_2^b$$

the axis of the planet wheel E will remain stationary, since the planet wheel E would be subjected to the same conditions entirely as the wheel G. If, however, this equation is converted into a variation, that is to say, if, for example, the pitch circle of the wheel D is made somewhat smaller than the pitch circle of the wheel F, in which case, of course, due regard must also be had to the new conditions as to the number of teeth of the wheels D, and E, the planet wheel E will evince rolling conditions different from those of the wheel G and consequently the planet wheel E will travel around and this rotation will be transmitted to the shaft W by the crank arm $k$. As a very slow travel of the planet wheel can be obtained by suitable selection of the velocity ratio, a very high velocity ratio can be obtained and the variation may be effected either as already stated by varying the size of the wheel D relatively to the wheel F, or by varying the size of the wheel C' relatively to the wheel C or by both variations.

In the modification illustrated in Figs. 2 and 3 the stationarily journaled intermediate wheel G is adapted to constitute the driving wheel in which case the ratio of the wheels G and F also determines the velocity ratio of the gearing.

I claim:

1. A planetary transmission gearing consisting of two trains of wheels of unequal velocity ratio each comprising an inner, outer and intermediate wheel, the inner wheels being connected to rotate in unison and the outer wheels being also connected to rotate in unison, a stationary journal for one intermediate wheel and means connecting the other intermediate wheel with a shaft.

2. A planetary transmission gearing consisting of two trains of wheels of unequal velocity ratio each comprising an inner, outer and intermediate wheel, the inner wheels being connected to rotate in unison and the outer wheels being also connected to rotate in unison, a stationary journal for one intermediate wheel, means connecting the other intermediate wheel with a shaft and means for transmitting motion to the train of wheels whose intermediate wheel is stationarily journaled.

3. In combination with two shaft ends, a planetary gearing for transmitting motion from one shaft to the other having two trains of wheels of unequal velocity ratio, each consisting of an inner, outer and intermediate wheel, comprising in combination, an inner wheel on one shaft, a second inner wheel mounted to rotate therewith, a stationarily journaled intermediate wheel meshing with the first-mentioned inner wheel, a planet wheel meshing with said second inner wheel, two outer wheels rotatable in unison with each other and meshing with said intermediate wheel and planet wheel respectively and means for transmitting motion from said planetary wheel to the other shaft.

4. In combination with two shaft ends, a planetary gearing for transmitting motion from one shaft to another having two trains of wheels of unequal velocity ratio, each consisting of an inner, outer and intermediate wheel, comprising in combination, an inner wheel on one shaft, a second inner wheel mounted to rotate therewith, a stationarily journaled intermediate wheel meshing with the first-mentioned inner wheel, a planet wheel meshing with said second inner wheel, a crank arm secured to the other shaft and supporting said planet wheel and two outer wheels meshing with said intermediate wheel and planet wheel respectively and mounted to rotate in unison with each other on the crank-arm carrying shaft.

In testimony whereof I have affixed my signature in presence of two witnesses.

HANS BARTSCH.

Witnesses:
 WOLDEMAR HAUPT,
 HENRY HASPER.